Patented May 16, 1933

1,909,694

UNITED STATES PATENT OFFICE

MAX ALBERT KUNZ, OF MANNHEIM, AND KARL KOEBERLE, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

VAT DYESTUFFS OF THE DIBENZANTHRONE SERIES

No Drawing. Application filed December 21, 1929, Serial No. 415,783, and in Germany April 8, 1927.

This invention relates to the production of new vat dyestuffs.

We have found that new valuable vat dyestuffs are obtained by condensing vat dyestuffs which contain the perylene ring system and which contain a plurality of negative substituents with only so much of a dibenzanthrone containing at least one nitrogen atom having a reactive hydrogen atom attached thereto as to produce compounds which still contain negative substituents. As regards the nitrogenous dibenzanthrones, preferably aminodibenzanthrone or derivatives or homologues thereof, in which one hydrogen atom of the amino group may be replaced by a low alkyl radicle such as a methyl, ethyl or propyl group, are employed for the condensation. The negative substituents in the other components may be, for example, halogen atoms or nitro groups. Suitable compounds of the said class are for example the halogen derivatives of dibenzanthrones, isodibenzanthrones, perylene quinones, allo-ms-naphthodianthrones, ms-benzdianthrones and the like. The said dyestuffs probably correspond to the general formula

where R stands for a dibenzanthrone radicle, R₁ stands for the radicle of a vat dyestuff containing the perylene ring system, which radicle contains at least one negative substituent and which may be substituted for example by further radicles of the type

and X stands for hydrogen or a low alkyl radicle.

The condensation is preferably carried out in solvents or diluting media of high boiling point such as nitrobenzene, naphthalene or quinoline, and acid-fixing agents, for example, the alkali metal salts of weak acids such as sodium acetate or the alkaline earth metal oxides and catalysts such as copper and its compounds are preferably added. Excellent yields of the new dyestuffs are obtained.

The reaction products dissolve in concentrated sulphuric acid usually to a violet solution. They dye cotton from usually blue vats from blue to black shades of excellent fastness.

In the above described condensation process nitro compounds of dibenzanthrones may be used as the nitrogenous component if a reducing agent such as hydrazine hydrate or sulphur or hydrogen sulphide and the like be added to the reaction mixture.

The following examples will further illustrate the nature of this invention but the invention is not restricted thereto. The parts are by weight.

Example 1

17.6 parts of tetrabromdichlordibenzanthrone, obtainable by treating dibenzanthrone in chlorosulphonic acid with bromine at between 60° and 70° C. in the presence of iodine as a catalyst, are boiled in 1000 parts of nitrobenzene with 38 parts of aminodibenzanthrone, 20 parts of sodium acetate and 5 parts of copper oxide while stirring, until all aminodibenzanthrone has entered into reaction. The resulting product can be separated by filtration, by suction or by distilling off the solvent, if desired with the aid of reduced pressure or of steam or of both. The product probably corresponds to the formula

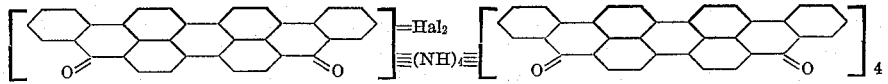

It is a black powder dissolving in concentrated sulphuric acid with a violet coloration and dyeing cotton from a blue vat bluish grey to bluish black shades of excellent fastness.

Example 2

7.8 parts of tetrabrom-isodibenzanthrone, obtainable by brominating isodibenzanthrone in chlorosulphonic acid with the aid of antimony as a catalyst, are finely suspended in 250 parts of nitrobenzene and boiled with 9.4 parts of aminodibenzanthrone, 10 parts of sodium acetate and 2 parts of copper oxide while stirring, until unaltered aminodibenzanthrone can no longer be detected. The product is worked up as described in Example 1. It is a bluish black powder dissolving in concentrated sulphuric acid with a violet coloration and dyeing the vegetable fibre from a blue vat grey-blue to bluish black shades of excellent fastness.

*Example 3*

2.2 parts of dibromperylenequinone, obtainable by brominating perylenequinone in aqueous suspension by means of an alkaline bromine solution, are boiled in 100 parts of nitrobenzene with 5 parts of sodium acetate, 0.1 part of copper oxide and 2.35 parts of aminodibenzanthrone while stirring, until all aminodibenzanthrone has entered into reaction. The product is worked up in the usual manner. The resulting dyestuff is a bluish black powder dissolving with a bluish red coloration in concentrated sulphuric acid and dyeing the vegetable fibre from a blue vat grey to black shades of excellent fastness.

*Example 4*

47.5 parts of dichlor-allo-ms-naphthodianthrone, obtainable by chlorinating allo-ms-naphthodianthrone with sulphuryl chloride in nitrobenzene, are boiled in 1250 parts of nitrobenzene with 47 parts of aminodibenzanthrone, 25 parts of sodium acetate and 7 parts of copper oxide while stirring, until unaltered aminodibenzanthrone can no longer be detected. The mass is worked up in the usual manner. The reaction product which probably corresponds to the formula is a black powder dissolving with a violet coloration in concentrated sulphuric acid and dyeing the vegetable fibre from a blue vat bluish grey to black shades of very good fastness.

*Example 5*

35 parts of tetrabrom-ms-benzdianthrone, obtainable by brominating ms-benzdianthrone in nitrobenzene at 160° to 180° C., are boiled in 500 parts of nitrobenzene with 25 parts of magnesia, 10 parts of copper oxide and 72 parts of aminodibenzanthrone while stirring, until all aminodibenzanthrone has entered into reaction. The dyestuff which is obtained in the form of a black powder by working up the mass in the usual manner, dissolves in concentrated sulphuric acid with a violet coloration and dyes cotton from a blue vat grey to black shades of very good fastness and in particular very good fastness to bucking.

*Example 6*

70 parts of tetrabrom-ms-naphthodianthrone are boiled in 1000 parts of nitrobenzene with 50 parts of sodium acetate, 15 parts of copper oxide and 94 parts of aminodibenzanthrone while stirring, until all aminodibenzanthrone has entered into reaction. The mass is worked up in the usual manner, whereby the dyestuff probably corresponding to the formula

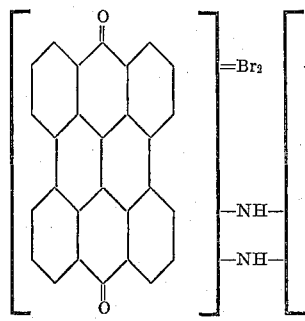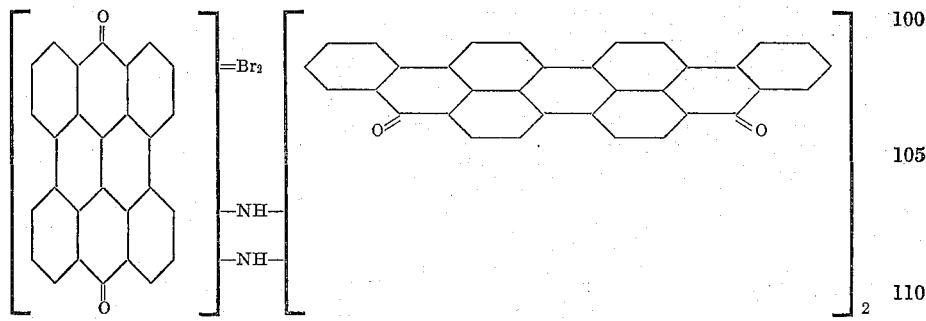

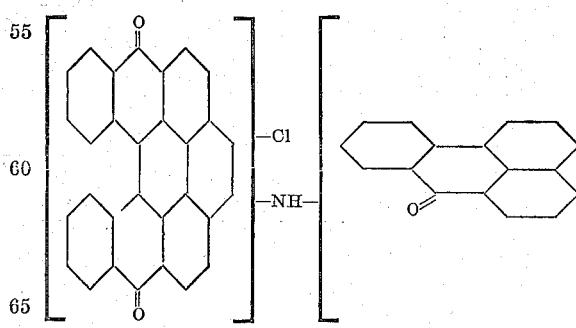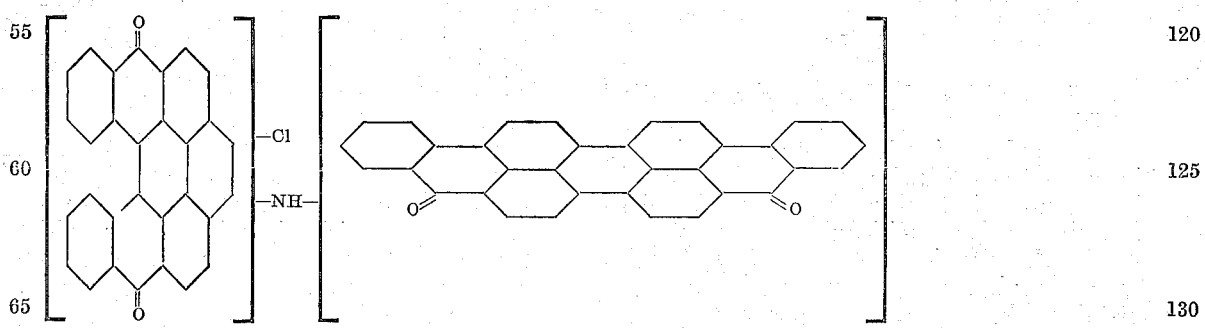

is obtained in the form of a black powder dissolving in concentrated sulphuric acid with a violet coloration and dyeing cotton grey to black shades of excellent fastness from a blue vat.

This application is a continuation in part of our copending application Ser. No. 267,478, filed April 4th, 1928.

What we claim is:

1. The process of producing vat dyestuffs which comprises condensing a vat dyestuff containing a perylene ring system and containing a plurality of substituents selected from the group consisting of halogen and the nitro group with only so much of a dibenzanthrone containing at least one nitrogen atom having a reactive hydrogen atom attached thereto as to produce a condensation product still containing at least one substituent selected from the group consisting of halogen and the nitro group.

2. The process of producing vat dyestuffs which comprises condensing a vat dyestuff containing a perylene ring system and containing a plurality of substituents selected from the group consisting of halogen and the nitro group with only so much of a dibenzanthrone containing at least one nitrogen atom having a reactive hydrogen atom attached thereto as to produce a condensation product still containing at least one substituent selected from the group consisting of halogen and the nitro group, in the presence of an inert organic diluent of high boiling point.

3. The process of producing vat dyestuffs which comprises condensing a vat dyestuff containing a perylene ring system and containing a plurality of substituents selected from the group consisting of halogen and the nitro group with only so much of a dibenzanthrone containing at least one nitrogen atom having a reactive hydrogen atom attached thereto as to produce a condensation product still containing at least one substituent selected from the group consisting of halogen and the nitro group, in the presence of an acid fixing agent.

4. The process of producing vat dyestuffs which comprises condensing a vat dyestuff containing a perylene ring system and containing a plurality of substituents selected from the group consisting of halogen and the nitro group with only so much of a dibenzanthrone containing at least one nitrogen atom having a reactive hydrogen atom attached thereto as to produce a condensation product still containing at least one substituent selected from the group consisting of halogen and the nitro group, in the presence of a copper compound.

5. Blue to black vat dyestuffs giving bluish vats and violet solutions in concentrated sulphuric acid, the said dyestuffs probably corresponding to the general formula

in which R stands for a dibenzanthrone radicle, $R_1$ stands for the radicle of a vat dyestuff containing a perylene ring system and containing at least one substituent selected from the group consisting of halogen and the nitro group, and X stands for hydrogen or a low alkyl radicle.

6. Blue to black vat dyestuffs giving bluish vats and violet solutions in concentrated sulphuric acid, the said dyestuffs probably corresponding to the general formula

in which R stands for a dibenzanthrone radicle, $R_1$ stands for the radicle of a vat dyestuff containing a perylene ring system and containing at least one substituent selected from the group consisting of halogen and the nitro group, which radicle is substituted by at least one further radicle of the type

and X stands for hydrogen or a low alkyl radicle.

7. Blue to black vat dyestuffs giving bluish vats and violet solutions in concentrated sulphuric acid, the said dyestuffs probably corresponding to the general formula

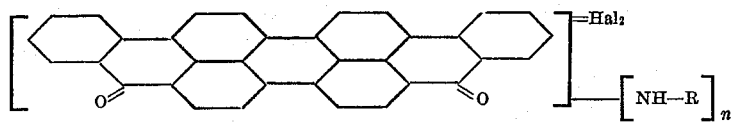

in which R stands for the radicle of dibenzanthrone or isodibenzanthrone, $n$ is from 2 to 4 and Hal means chlorine or bromine.

8. The vat dyestuff probably corresponding to the formula

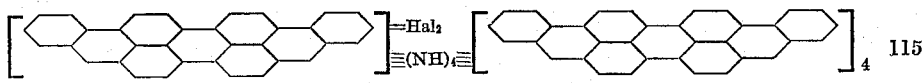

in which Hal means chlorine or bromine, which dyestuff dyes cotton from a blue vat bluish grey to bluish black shades and dissolves in concentrated sulphuric acid with a violet coloration.

In testimony whereof we have hereunto set our hands.

MAX ALBERT KUNZ.
KARL KOEBERLE.